(12) United States Patent
Liu et al.

(10) Patent No.: US 11,991,114 B2
(45) Date of Patent: May 21, 2024

(54) FEEDBACK FROM NETWORK CODING (NC) ENCODING DEVICE TO TRANSMITTING DEVICE

(71) Applicant: QUALCOMM Incorporated, San Diego, CA (US)

(72) Inventors: Guangyi Liu, San Diego, CA (US); Gabi Sarkis, San Diego, CA (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/497,739

(22) Filed: Oct. 8, 2021

(65) Prior Publication Data
US 2023/0111372 A1    Apr. 13, 2023

(51) Int. Cl.
*H04L 5/00* (2006.01)
*H04W 72/1263* (2023.01)
(Continued)

(52) U.S. Cl.
CPC ....... *H04L 5/0053* (2013.01); *H04W 72/1263* (2013.01); *H04W 72/20* (2023.01); *H04W 80/02* (2013.01)

(58) Field of Classification Search
CPC .................. H04L 5/0053; H04L 1/0057; H04L 2001/0093; H04L 1/188; H04L 1/1896;
(Continued)

(56) References Cited

U.S. PATENT DOCUMENTS

| | | | | |
|---|---|---|---|---|
| 2011/0164621 A1* | 7/2011 | Lee | ..................... | H04L 1/0076 370/400 |
| 2014/0133391 A1* | 5/2014 | Djukic | ................. | H04L 1/1864 370/328 |

(Continued)

FOREIGN PATENT DOCUMENTS

| | | |
|---|---|---|
| WO | 2011090327 A2 | 7/2011 |
| WO | 2014190813 A1 | 12/2014 |

OTHER PUBLICATIONS

International Search Report and Written Opinion—PCT/US2022/074670—ISA/EPO—dated Nov. 2, 2022.

*Primary Examiner* — Afshawn M Towfighi
(74) *Attorney, Agent, or Firm* — Arent Fox, LLP

(57) ABSTRACT

This disclosure provides systems, methods and apparatus, including computer programs encoded on computer storage media, for retransmission of sidelink transmissions using network coding. A transmitting device transmits a transport block and a request for a NC encoding device to retransmit the transport block to a plurality of UEs. The NC encoding device transmits a packet encoding a plurality of transport blocks previously transmitted by one or more transmitting devices. The NC encoding device receives a plurality of acknowledgments (ACK) or negative acknowledgments (NACK) for the plurality of transport blocks from the plurality of UEs. The NC encoding device determines whether a respective transport block has satisfied an ACK condition based on the plurality of ACKs or NACKs from the plurality of UEs. The NC encoding device transmits an acknowledgment message to the one or more transmitting devices for at least the respective transport block.

30 Claims, 10 Drawing Sheets

(51) Int. Cl.
*H04W 72/20* (2023.01)
*H04W 80/02* (2009.01)

(58) Field of Classification Search
CPC .. H04W 72/1263; H04W 72/20; H04W 80/02
See application file for complete search history.

(56) References Cited

U.S. PATENT DOCUMENTS

2020/0389258 A1* 12/2020 Lei ........................... H04L 1/08
2022/0053537 A1* 2/2022 Lei ........................ H04L 1/1861
2022/0256573 A1* 8/2022 Frenne .................. H04L 5/0053
2023/0063027 A1* 3/2023 Liu ...................... H04L 47/283

* cited by examiner

FEEDBACK FROM NETWORK CODING (NC) ENCODING DEVICE TO TRANSMITTING DEVICE

BACKGROUND

Technical Field

The present disclosure relates generally to communication systems, and more particularly, to apparatuses and methods of providing feedback from a network coding (NC) encoding device to a transmitting device.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication at a network coding (NC) encoder. The method includes transmitting a packet encoding a plurality of transport blocks previously transmitted by one or more transmitting devices. The method includes receiving a plurality of acknowledgments (ACK) or negative acknowledgments (NACK) for the plurality of transport blocks from a plurality of user equipment (UEs). The method includes determining, for a respective transport block of the plurality of transport blocks encoded in the packet, whether the respective transport block has satisfied an ACK condition based on the plurality of ACKs or NACKs from the plurality of UEs. The method includes transmitting an acknowledgment message to the one or more transmitting devices for at least the respective transport block, the acknowledgment message indicating an ACK if the respective transport block has satisfied the ACK condition or a NACK if the ACK condition has not been satisfied at an expiration time after transmitting the packet.

The disclosure also provides an apparatus (e.g., a network coding encoder) including a memory storing computer-executable instructions and at least one processor configured to execute the computer-executable instructions to perform the above method, an apparatus including means for performing the above method, and a computer-readable medium storing computer-executable instructions for performing the above method.

In an aspect, the disclosure provides a method of wireless communication at a transmitting device. The method includes transmitting a transport block and a request for a NC encoding device to retransmit the transport block to a plurality of UEs. The method includes receiving, from the NC encoding device, an acceptance of the request. The method includes receiving, from the NC encoding device, an acknowledgment message for the transport block, the acknowledgment message indicating an ACK if the transport block has satisfied an ACK condition or a NACK if the ACK condition has not been satisfied at an expiration time after the acceptance of the request.

The disclosure also provides an apparatus (e.g., a user equipment) including a memory storing computer-executable instructions and at least one processor configured to execute the computer-executable instructions to perform the above method, an apparatus including means for performing the above method, and a computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
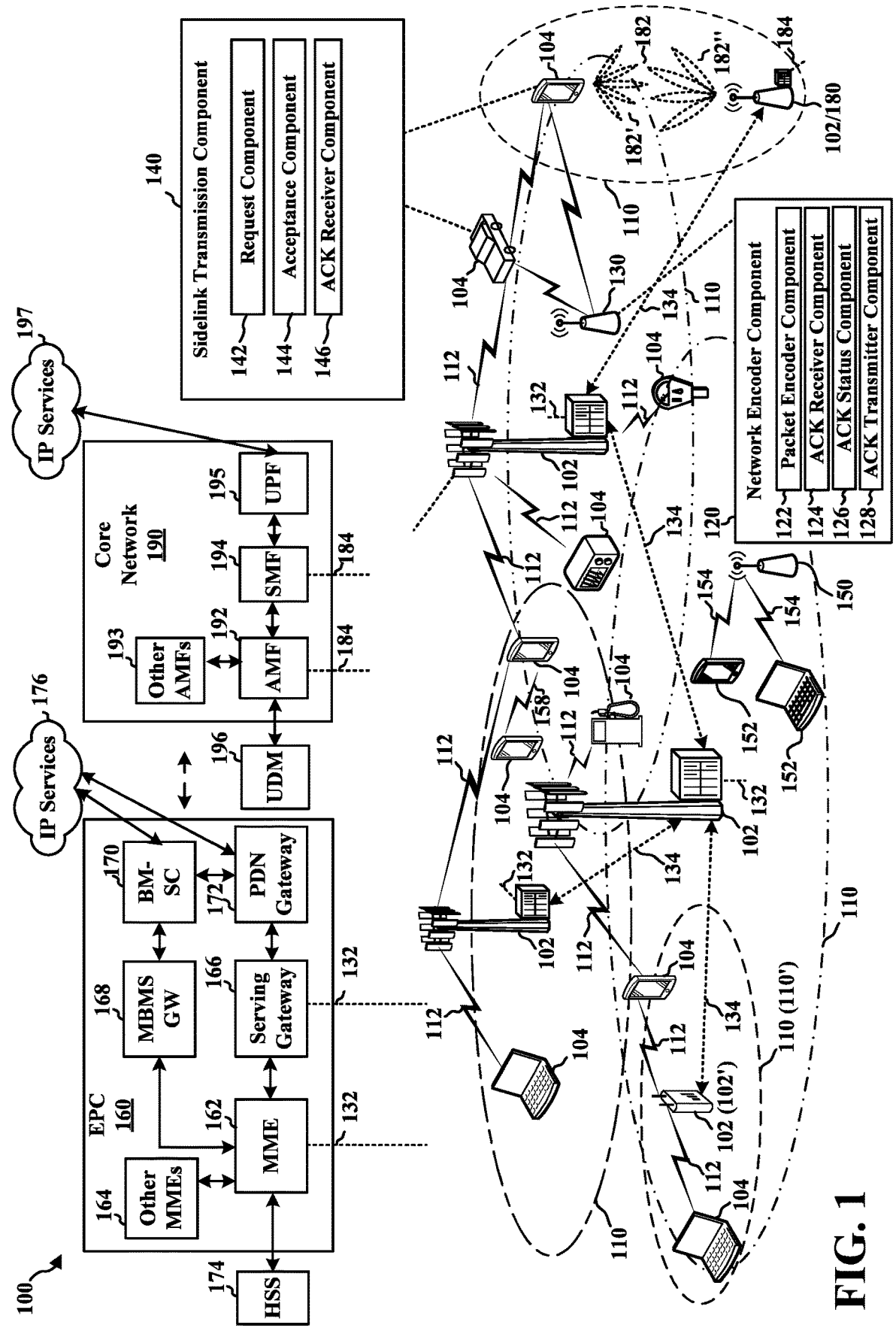
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) may communicate with another wireless communication device via a sidelink, which may also be referred to as direct link communications of device-to-device (D2D) communication technologies. As used herein, a direct link refers to a direct wireless communications path from a first wireless device to a second wireless device. For example, in fifth generation (5G) new radio (NR) communication technologies a direct link between two user equipment (UEs) may be referred to as a sidelink (SL), as opposed to communications over the Uu interface (e.g., from gNB to UE). Direct links may be utilized in D2D communication technologies that can include vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a direct link channel.

In various wireless communications technologies, such as 5G NR, an acknowledgment (ACK)/negative acknowledgment (NACK) protocol may be used to confirm that an intended recipient has successfully received a communication. For example, for sidelink communications, a sidelink physical feedback channel (PSFCH) may be used by a receiving device to transmit an ACK or NACK. Due to the number of devices that may perform sidelink communications to multiple devices, significant resources may be used for signaling ACKs or NACKs and performing retransmissions.

One approach to increase system capacity and improve resource utilization is to utilize network coding (NC) for retransmissions. In general, network coding involves jointly coding two or more messages into a single transmission. For example, erasure coding may be utilized to provide recovery from erasures. For instance, single parity check codes can correct one erasure. If the input is [a, b,c], which is encoded to [a, b, c, a+b+c], any single erasure can be recovered. For example, the encoding can be viewed as a linear system (over a Galois field) with three variable and four linear independent constraints. Any three constraints (one erasure) are sufficient to find the three variables. The single parity example can be extended using Reed-Solomon or other maximum distance separable (MDS) codes.

In the context of retransmission of sidelink communications, a NC encoding device may perform retransmissions by encoding two or more transport blocks that were previously transmitted. Because sidelink transmissions may be received by different receiving devices, each receiving device may have received a different combination of the previously transmitted transport blocks. Each receiving device, however, may utilize the network coded retransmission to recover a transport block that was not correctly received. In an aspect, the NC encoding device may monitor the PSFCH for ACK/NACK from the receiving devices to determine which transport blocks should be retransmitted. The NC encoding device may select the transport blocks for retransmission as a network coded packet to reduce the number of retransmissions. For example, the NC encoding device may select a combination of transport blocks that is likely to result in a greatest number of receiving devices being able to decode or recover an additional transport block.

When the NC encoding device performs retransmissions, the receiving devices may receive the transport blocks using fewer total transmission resources for the retransmissions. The transmitting devices, however, may not receive the ACK/NACK feedback for the network coded packets and may not know whether the receiving devices have received a transport block.

In an aspect, the present disclosure provides for communications between the NC encoding device and transmitting devices to inform the transmitting devices of an acknowledgment status for transport blocks using network coding for retransmission. After the NC encoding device transmits a packet encoding a plurality of transport blocks, the network coding device may receive ACK or NACK for the plurality of transport blocks. For instance, the ACK or NACK from a receiving device may be for the network coded packet or include a status of each transport block within the packet. Based on the received ACKs and/or NACKs and an ACK condition for a transport block, the NC encoding device may determine an ACK status for the transport block. In some implementations, the ACK condition may be selected by the transmitting device when requesting the retransmission by the network coding device. The NC encoding device may transmit an acknowledgment message to the original transmitting device. The acknowledgment message may include the acknowledgment status for the transport block. Accordingly, the original transmitting device may determine whether the transport block was received by the intended receiving devices.

Particular implementations of the subject matter described in this disclosure can be implemented to realize one or more of the following potential advantages. Use of network coding may improve efficiency of resource utilization for retransmissions. In some cases, transmissions from a network coding device may be more likely to be correctly received (e.g., when the network coding device is stationary and/or elevated). The acknowledgment message from the network coding device to the transmitting device may simplify feedback from multiple intended receiving devices.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. In an aspect, the wireless communications system may include a network coding (NC) encoding device 130. The NC encoding device 130 may be, for example, a road side unit (RSU) or a UE.

In an aspect, one or more of the UEs 104 may include a sidelink transmission component 140 configured to perform sidelink transmissions with retransmission by a NC encoding device 130. The sidelink transmission component 140 may include a request component 142 configured to transmit a transport block and a request for the NC encoding device 130 to retransmit the transport block to a plurality of UEs 104. The sidelink transmission component 140 may include an acceptance component 144 configured to receive, from the NC encoding device 130, an acceptance of the request. The sidelink transmission component 140 may include an ACK receiver component 146 configured to receive, from the NC encoding device, an acknowledgment message for the transport block. The acknowledgment message may indicate an ACK if the transport block has satisfied an ACK condition or a NACK if the ACK condition has not been satisfied at an expiration time after the acceptance of the request.

In an aspect, the NC encoding device 130 may include a network encoder component 120 configured to retransmit transport blocks from transmitting devices as a network coded packet and report an ACK status to the transmitting devices. The network encoder component 120 may include a packet encoder component 122 configured to transmit a packet encoding a plurality of transport blocks previously transmitted by one or more transmitting devices (e.g., UEs 104). The network encoder component 120 may include an ACK receiver component 124 configured to receiving a plurality of ACKs or NACKs for the plurality of transport blocks from a plurality of UEs. The network encoder component 120 may include an ACK status component 126 configured to determine, for a respective transport block of the plurality of transport blocks encoded in the packet, whether the respective transport block has satisfied an ACK condition based on the plurality of ACKs or NACKs from the plurality of UEs. The network encoder component 120 may include an ACK transmitter component 128 configured to transmit an acknowledgment message to the one or more transmitting devices for at least the respective transport block. The acknowledgment message may indicate an ACK if the respective transport block has satisfied the ACK condition or a NACK if the ACK condition has not been satisfied at an expiration time after transmitting the packet.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 112 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 112 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

Figure 2:
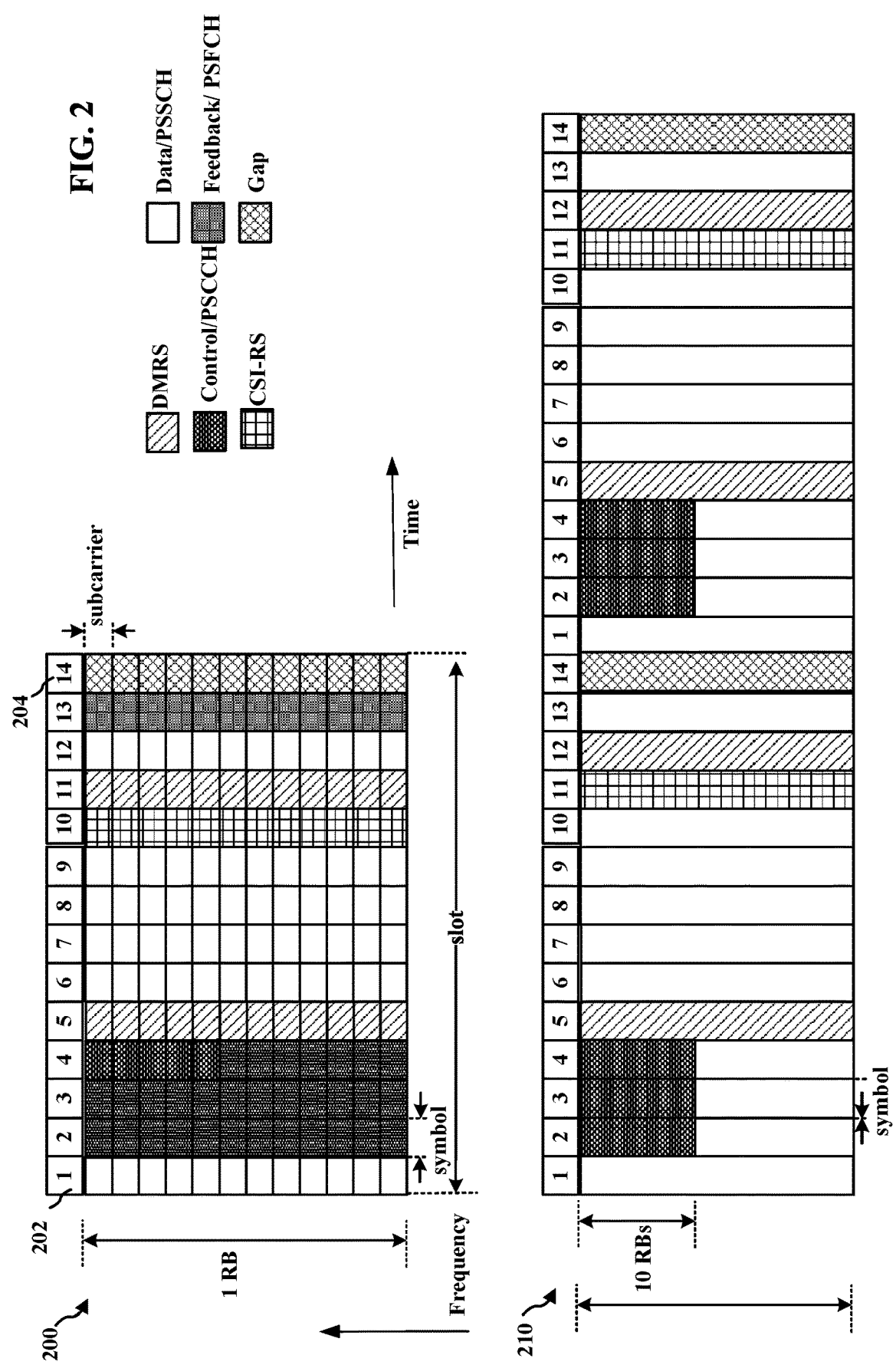
FIG. 2 illustrates an example of a sidelink slot structure.

FIG. 2 illustrates example diagrams 200 and 210 illustrating examples slot structures that may be used for wireless communication between UEs 104 and/or a NC encoding device 130, e.g., for sidelink communication. The slot structure may be within a 5G NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single slot transmission, e.g., which may correspond to a 0.5 ms transmission time interval (TTI). Diagram 210 illustrates multiple slots and RBs. Diagram 200 illustrates a single RB, whereas diagram 210 illustrates N RBs. In diagram 210, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information, e.g., a physical sidelink control channel (PSCCH) along with demodulation RS (DMRS). The control information may include Sidelink Control Information (SCI). The SCI may reserve resources for data, e.g., a physical sidelink shared channel (PSSCH). In NR, PSCCH and PSSCH may be time domain multiplexed. The first symbol 202 in the slot may be for automatic gain control (AGC) for pre-processing the control and/or data information and/or to normalize the incoming signal power. The last symbol 204 may be a gap symbol or guard symbol. At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. The position of any of the SCI, data, and feedback symbols may be different than the example illustrated in FIG. 2.

FIG. 2 also illustrates that symbol(s) may include CSI-RS. The symbols in FIG. 2 that are indicated for DMRS or CSI-RS indicate that the symbol comprises DMRS or CSI-RS REs. Such symbols may also include REs that include data. For example, if a number of ports for DMRS or CSI-RS is 1 and a comb-2 pattern is used for DMRS/CSI-RS, then half of the REs may comprise the RS and the other half of the REs may comprise data. A CSI-RS resource may start at any symbol of a slot, and may occupy 1, 2, or 4 symbols depending on a configured number of ports. CSI-RS can be periodic, semi-persistent, or aperiodic (e.g., based on DCI triggering). For time/frequency tracking, CSI-RS may be either periodic or aperiodic. CSI-RS may be transmitted in busts of two or four symbols that are spread across one or two slots.

An example of sidelink communication may include cellular vehicle to everything (CV2X) applications. To receive sidelink packets, the receiver (RX) may perform blind decoding in some or all sub-channels. The number of sub-channels may range from, e.g., 1-27 channels. PSCCH and PSSCH may be transmitted within a same slot. PSSCH may occupy up to $N_{subchannel}^{SL}$ contiguous sub-channels. PSCCH may occupy one sub-channel with the lowest sub-channel index. The first-stage SCI (SCI-1) may be transmitted in PSCCH containing information about PSSCH bandwidth and resource reservation in future slots. The second-stage SCI (SCI-2) may be found and decoded after decoding PSCCH. The source identification (ID) and/or destination ID may be used to identify the transmitting UE and the receiving UE of the packet, respectively. The size of the sub-channels in vehicle to everything (V2X) may be 10 or more resource blocks (RBs). In CV2X, the UEs may decode all transmissions and blind decode all sub-channels.

Figure 3:
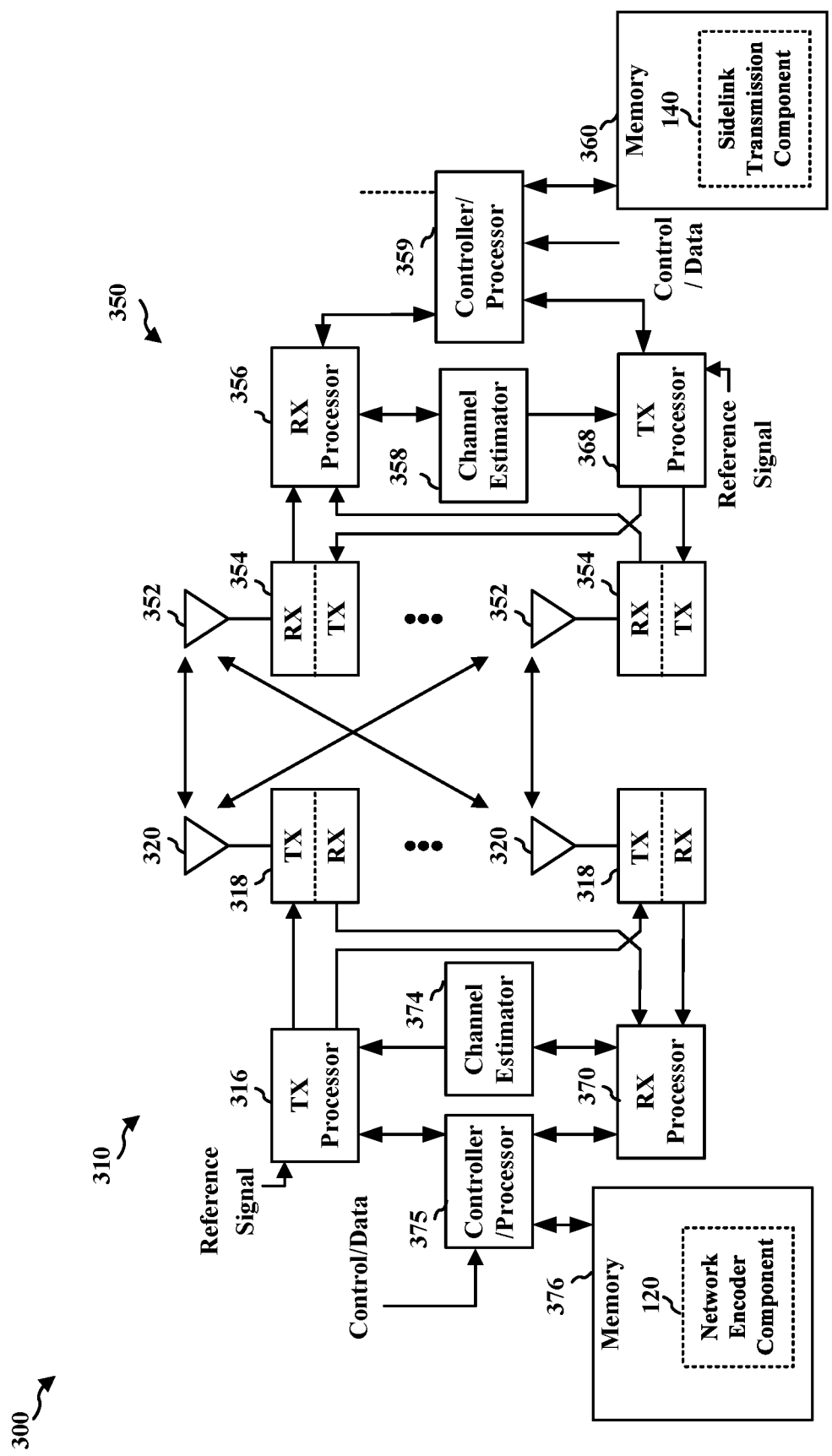
FIG. 3 is a diagram illustrating an example of a base station and user equipment (UE) in an access network.

FIG. 3 is a block diagram 300 of a first wireless communication device 310 in communication with a second wireless communication device 350, e.g., via V2V/V2X/D2D communication. The device 310 may comprise a transmitting device communicating with a receiving device, e.g., device 350, via V2V/V2X/D2D communication. The communication may be based, e.g., on sidelink. The transmitting device 310 may comprise a UE, an RSU, etc. The receiving device may comprise a UE, an RSU, etc. Packets may be provided to a controller/processor 375 that implements layer 3 and layer 2 functionality. Layer 3 includes a RRC layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with the sidelink transmission component 140 of FIG. 1.

At least one of the TX processor 316, the RX processor 370, and the controller/processor 375 may be configured to perform aspects in connection with the network encoder component 120 of FIG. 1.

Figure 4B:
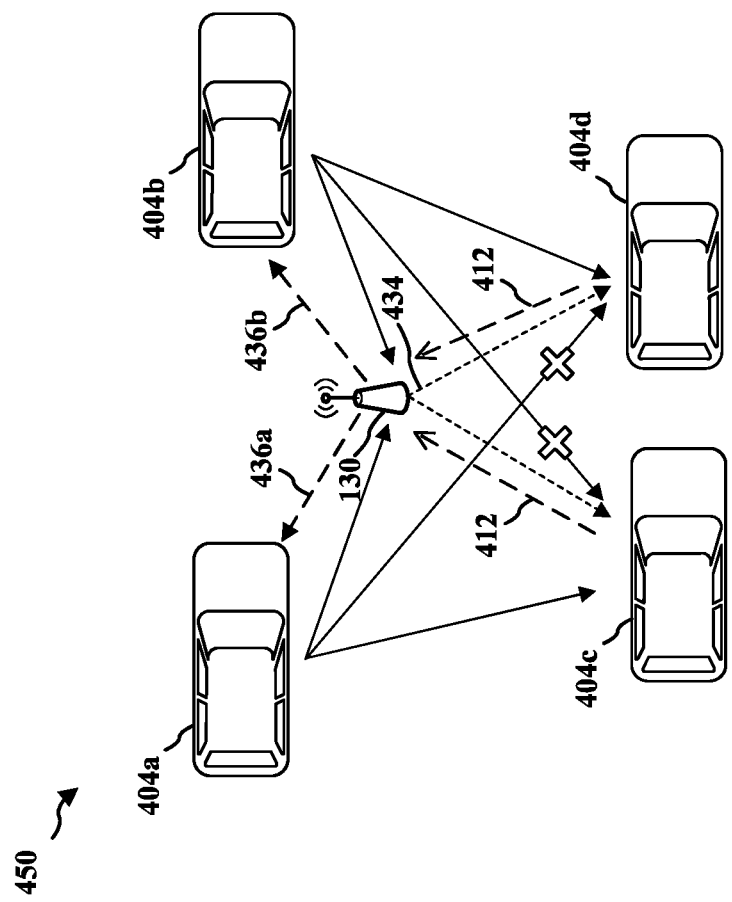
FIG. 4B is a diagram of an example of sidelink transmissions between multiple UEs with a network coding (NC) encoding device performing retransmission.
Figure 4A:
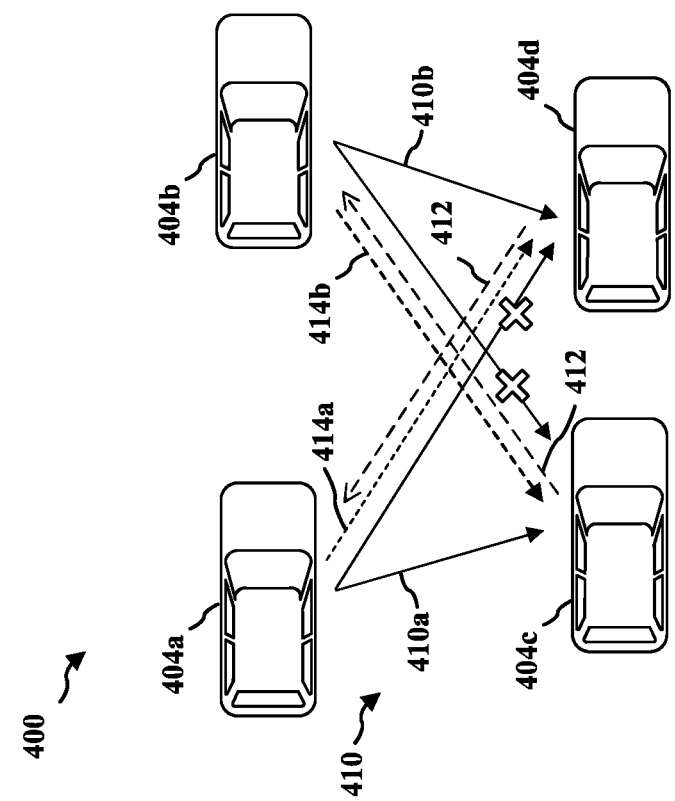
FIG. 4A is a diagram of an example of sidelink transmissions and retransmissions between multiple UEs.

FIG. 4A is a diagram 400 of an example of sidelink transmissions and retransmissions between multiple UEs. For example, two transmitting UEs 404a and 404b may each transmit a message 410a, 410b to two receiving UEs 404c and 404d. As illustrated, the receiving UE 404c may correctly receive the message 410a but not the message 410b. The receiving UE 404d may correctly receive the message 410b but not the message 410a. Each of the receiving UEs 404c and 404d may transmit a NACK to the respective transmitting UE 404a, 404b for the message 410a, 410b that was not correctly received on a feedback channel (e.g., PSFCH 412). In some implementations (not illustrated), each of the receiving UEs 404c and 404d may transmit an ACK for the successfully received messages 410a, 410b on the PSFCH 412. The transmitting UEs 404a and 404b may then transmit retransmissions 414a and 414b to the respective receiving devices. The receiving UEs 404c and 404d may transmit ACK or NACK on the PSFCH 412, and additional retransmission 414a and 414b may be transmitted if necessary. It should be understood that each retransmission 414a, 414b uses separate resources. The amount of resources for retransmission may increase as the number of transmissions of messages 410a, 410b increases. The amount of resources for retransmission may also increase as the number of receiving UEs 404c, 404d increases and the likelihood of a NACK on PSFCH 412 for at least one transmission of message 410a, 410b increases.

FIG. 4B is a diagram 450 of an example of sidelink transmissions between multiple UEs with a NC encoding device 130 performing retransmission. As in the example of FIG. 4A, two transmitting UEs 404a and 404b may each transmit a message 410a, 410b to two receiving UEs 404c and 404d. The NC encoding device 130 may also receive the messages 410a and 410b, which may include a request for the NC encoding device 130 to perform retransmissions. Again, the receiving UE 404c may correctly receive the message 410a but not the message 410b, and the receiving UE 404d may correctly receive the message 410b but not the message 410a. The receiving UEs 404c and 404d may transmit NACKs on the PSFCH 412. Instead of or in addition to the transmitting UEs 404a and 404b receiving the NACKs, the NC encoding device 130 may receive the NACKs (and any transmitted ACKS) on the PSFCH 412. The NC encoding device 130 may determine a set of messages 410 (e.g., transport blocks) to retransmit based on the NACKs on the PSFCH 412. The NC encoding device may encode the messages 410a and 410b into a single NC packet 434. It should be understood that the NC packet 434 may be approximately the same size as the messages 410a and 410b. Transmission of the NC packet 434 may use fewer resources than transmission of both retransmissions 414a and 414b. The receiving UEs 404c and 404d may be able to decode both messages 410a and 410b based on the previously received messages and the NC packet 434. For example, receiving UE 404c may decode the message 410b based on the previously received message 410a and the NC packet 434. The receiving UEs 404c and 404d may transmit an ACK or NACK on the PSFCH 412 to the NC encoding device 130. The NC encoding device 130 may transmit the same NC packet 434 or a different NC packet encoding different messages 410 depending on the ACK/NACK status for each message 410.

In an aspect, the transmitting UE 404a and 404b may or may not receive the ACK or NACKs on the PSFCH 412 from the receiving UEs 404c and 404d when the NC encoding device 130 performs the retransmissions. In some implementations, the transmitting UEs 404a and 404b may receive the ACK/NACK for a respective initial transmission of message 410, but may not listen for ACK/NACK for the NC packet 434. For instance, an NACK of the NC packet 434 from the receiving UE 404c may appear inconsistent to the transmitting UE 404a if the receiving UE 404c has already sent ACK for the message 410a. In some implementations (e.g., where the transmitting UEs 404a and 404b do not receive other messages 410), the transmitting UEs may be unable to determine an ACK status of a message 410 based on the ACK/NACK for the NC packet 434. In an aspect, the NC encoding device 130 may transmit an acknowledgment message 436a, 436b to a transmitting UE 404a, 404b based on an ACK condition and the ACKs/NACKs received for the messages 410 and the NC packet 434. Accordingly, the transmitting UEs 404a, 404b may accurately determine the acknowledgment status of a message 410 that is retransmitted by the NC encoding device 130.

Figure 5:
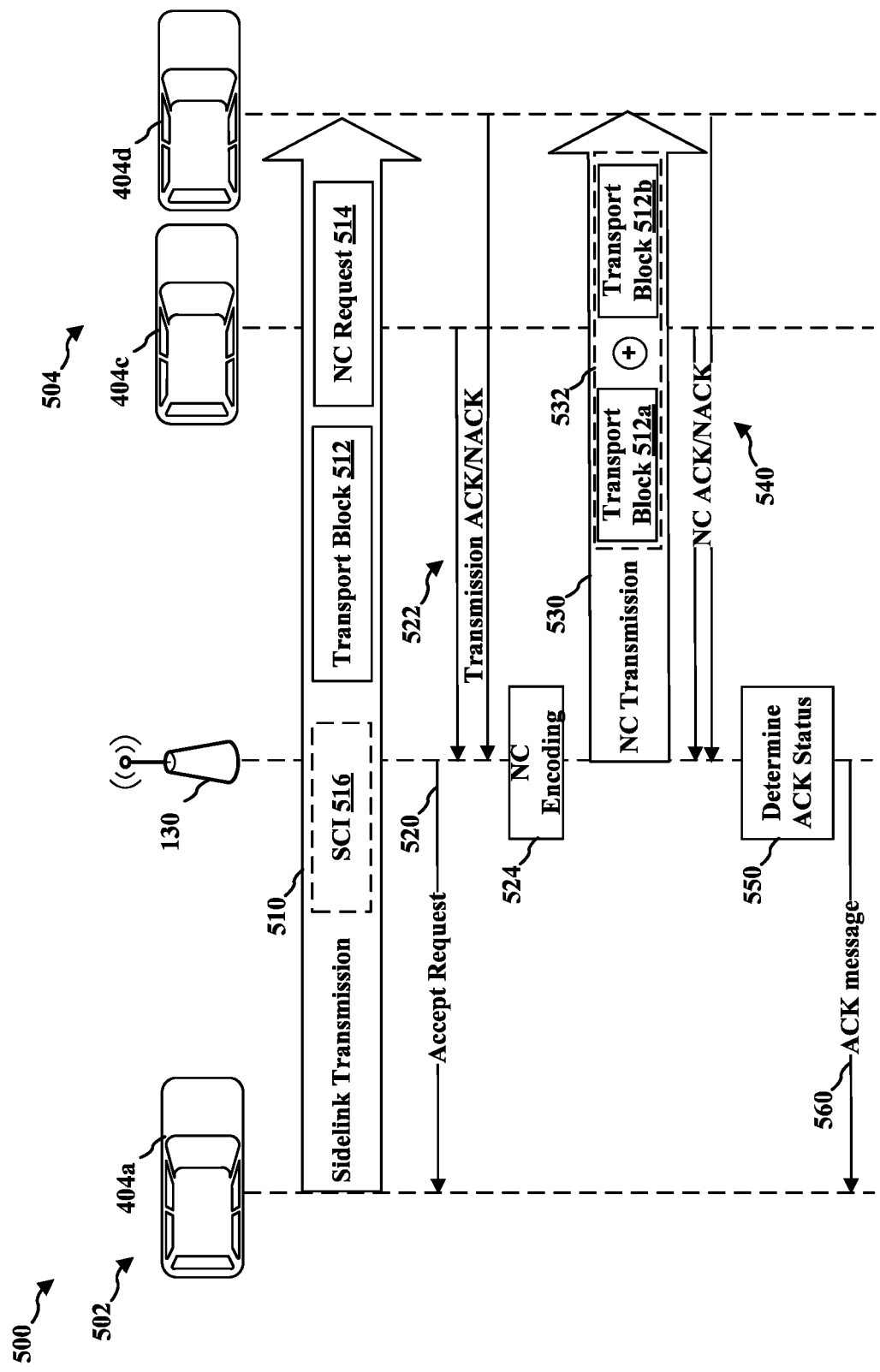
FIG. 5 is a message diagram illustrating example messages for retransmissions of sidelink transmissions using network coding.

FIG. 5 is a message diagram 500 illustrating example messages for retransmissions of sidelink transmissions using network coding. A transmitting device 502 (e.g., UE 404a) may transmit a sidelink transmission 510 to receiving devices 504, which may be a plurality of UEs (e.g., UEs 404c and 404d). The sidelink transmission 510 may correspond to the message 410a. In some implementations, the sidelink transmission 510 may include an SCI 516 on a PSSCH. The sidelink transmission 510 may include a transport block 512a. For example, the transport block 512a may be encoded according to a MCS selected by the UE 404a. The sidelink message 410 may include a NC request 514. The NC request 514 may indicate that the NC encoding device 130 is to retransmit the transport block 512a if necessary. In some implementations, the NC request 514 may specify whether the NC encoding device 130 is to transmit an ACK message 560.

The NC encoding device 130 may transmit an accept request message 520 in response to the NC request 514. The accept request message 520 may indicate that the NC encoding device 130 will retransmit the transport block 512a if necessary. The transmitting device 502 may refrain from monitoring the PSFCH 412 in response to the accept request message 520. The NC encoding device 130 may transmit the accept request message 520, for example, on the PSFCH as an ACK indicating acceptance. For instance, the accept request message 520 may have an earlier timing than a transmission ACK/NACK 522. In another implementation, the accept request message 520 may be combined with an ACK message 560 discussed in further detail below.

Each receiving UE 404c, 404d may transmit a transmission ACK/NACK 522. The transmission ACK/NACK may be transmitted on the PSFCH 412 in a similar manner as a sidelink transmission without an NC request 514. That is, the NC request 514 may be transparent to the receiving UEs 404c, 404d. The NC encoding device 130, however, may receive the transmission ACK/NACK 522 instead of or in addition to the transmitting UE 404a.

The NC encoding device 130 may perform NC encoding 524. The NC encoding 524 may include generating an NC transmission 530 based on an ACK/NACK status for each previously transmitted transport block for which the NC encoding device 130 is handling retransmissions. In an aspect, the NC encoding device 130 may handle retransmissions for a limited number of transport blocks 512 previously transmitted by transmitting UEs 404a that have indicated an NC request 514. For example, the number of transport blocks may be based on memory and processing constraints of the NC encoding device 130. The NC encoding device 130 may store an ACK/NACK status for each transport block 512 for each intended receiving device (e.g., UEs 404c, 404d). The NC encoding device 130 may update the ACK/NACK status when the NC encoding device 130 receives a transmission ACK/NACK 522 or a NC ACK/NACK 540 from an intended receiving device. The NC encoding device 130 may determine which transport blocks 512 to include in the NC transmission 530 based on the ACK/NACK statuses. For instance, in an implementation, the NC encoding device may search for a combination of transport blocks 512 that would change the greatest number of NACK statuses to ACK if correctly received by each intended receiving device. For instance, as illustrated, the NC encoding device 130 may select the transport block 512a from the transmitting UE 404a and a transport block 512b from a different transmitting UE 404. The NC encoding device 130 may encode the selected transport blocks 512 into an NC packet 532 within the NC transmission 530. For example, the NC encoding device 130 may utilize a single erasure code such as a single parity check code or utilize a multiple erasure code such as a Reed-Solomon code or other MDS code to generate an NC packet 532. In some implementations, the NC encoding device 130 may perform channel coding on the encoded packet 532. The NC encoding device 130 may transmit the NC transmission 530 as a sidelink transmission (e.g., on the PSSCH).

Each intended receiving device 504 may attempt to receive the NC transmission 530 and attempt to decode the encoded transport blocks 512 based on previously received transport blocks (e.g., in sidelink transmission 510). That is, a receiving device 504 may first decode the NC transmission 530 to determine that the NC packet 532 was correctly received. The receiving device 504 may then perform network decoding based on a previously received transport block (e.g., transport block 512*b*) to recover one or more additional transport blocks (e.g., transport block 512*a*) from the NC packet 532. Each intended receiving device 504 may transmit an NC ACK/NACK 540 based on the decoding status of the NC transmission 530. In an aspect, the NC ACK/NACK 540 may indicate the decoding status of the NC packet 532. In another aspect, the NC ACK/NACK 540 may indicate the decoding status of each transport block 512 encoded within the NC packet 532.

The NC encoding device 130 may determine an ACK status 550 for each transport block.

In an aspect, the NC encoding device 130 may determine an ACK/NACK status of each transport block for each intended receiving device 504 based on the NC ACK/NACK 540.

For example, where the NC ACK/NACK 540 indicates the decoding status of the NC packet 532, the NC encoding device 130 may determine which transport blocks 512 the receiving device 504 was able to decode using network coding. For example, if a receiving device 504 had previously acknowledged all of the transport blocks 512 except for one missing transport block, the NC encoding device 130 may determine that the receiving device 504 was able to decode the missing transport block. In some cases, even if the receiving device 504 correctly receives the NC packet 532, the receiving device 504 may not be able to decode a specific transport block 512 (e.g., because the receiving device 504 had not previously successfully received other transport blocks 512 encoded in the NC packet 532). In another implementation where the NC ACK/NACK 540 indicates an ACK/NACK status for each transport block 512 encoded in the NC transmission 530, the NC encoding device 130 may update the ACK/NACK status of each transport block 512 for the respective receiving device. The NC encoding device 130 may apply the ACK condition to the ACK/NACK status of a transport block 512 for each receiving device 504 to determine the ACK message 560.

The NC request 514 may specify an ACK condition for determining an ACK status of the transport block 512*a*. A first example ACK condition may specify that the NC encoding device 130 is to transmit an ACK message 560 for the block indicating an ACK when at least one ACK has been received from an intended receiving device. The NC encoding device 130 may transmit a NACK when no ACK has been received from any of the intended receiving devices by an expiration time after transmitting the NC packet. A second example ACK condition may specify that the NC encoding device 130 is to transmit an ACK message 560 if the NC encoding device 130 has received an ACK from each of the intended receiving devices. The NC encoding device 130 may transmit a NACK if the NC encoding device 130 has not received ACK for any of the intended receiving devices at the expiration time after transmitting the NC packet. A third example ACK condition may specify that the NC encoding device 130 is to transmit an ACK message 560 if the NC encoding device 130 has not received a NACK for the NC packet 434 by the expiration time. The NC encoding device 130 may transmit a NACK if the NC encoding device 130 has received a NACK for the NC packet 434 from any intended receiving device. In an aspect, the expiration time may refer to a specified time after transmission of the NC packet 434. For example, the expiration time may be specified by an expiration period measured from acceptance of the NC request 514 or transmission of a first NC packet 434 for the transport block 512*a*. The expiration period may be preconfigured (e.g., specified in a standard or regulation), selected by the transmitting UE 404*a* (e.g., in the NC request 514), or selected by the NC encoding device 130 (and signaled in the accept request message 520).

In some implementations, the ACK message 560 may be transmitted on the PSFCH 412.

For example, the ACK message 560 may indicate ACK if the transport block 512 has satisfied the ACK condition or indicate NACK if the transport block 512 has not satisfied the ACK condition by the expiration time after transmitting the NC transmission 530. In some implementations, the ACK message 560 may be a dedicated packet in a higher layer message. For example, the ACK message 560 may be an RRC message or a MAC-CE. The ACK message 560 may be unicast or groupcast to a group of transmitting devices that have requested NC retransmission. When transmitted as a higher layer message, the ACK message 560 may include information for multiple transport blocks. For instance, the ACK message 560 may include all ACKs received from intended receiving devices for any transport block where the transmitting device has not acknowledged the ACK message 560. The ACK message 560 may include each of the ACKs or NACKs from the intended receiving devices for the respective transport block. For example, the ACK message 560 may include the ACK/NACK status for each UE for the transport block. The ACK message 560 may include an ACK for each of the transport blocks 512 that have satisfied the ACK condition and have not been acknowledged by the transmitting device. The ACK message 560 may include a NACK for each transport block that has not satisfied the ACK condition prior to the expiration time. For example, the ACK message 560 may include a NACK for each transport block that has not received at least one ACK prior to the expiration time or a NACK for each transport block that has not received an ACK from each of the plurality of UEs. In some implementations, the ACK message 560 may be combined with the accept request message 520. For example, the ACK message 560 may include an indication of acceptance of a NC request 514 for one or more transport blocks that have been transmitted by the transmitting device but not retransmitted in an NC transmission 530. In some implementations, the ACK message 560 may include an indication of whether the transmitting device is to acknowledge the ACK message 560. The ACK message 560 may be transmitted in response to receiving the NC ACK/NACK 540 and/or determining the ACK status 550. Alternatively, the ACK message 560 may be transmitted periodically. For example, the ACK message 560 may be scheduled with persistent or semi-persistent scheduling.

Figure 6:
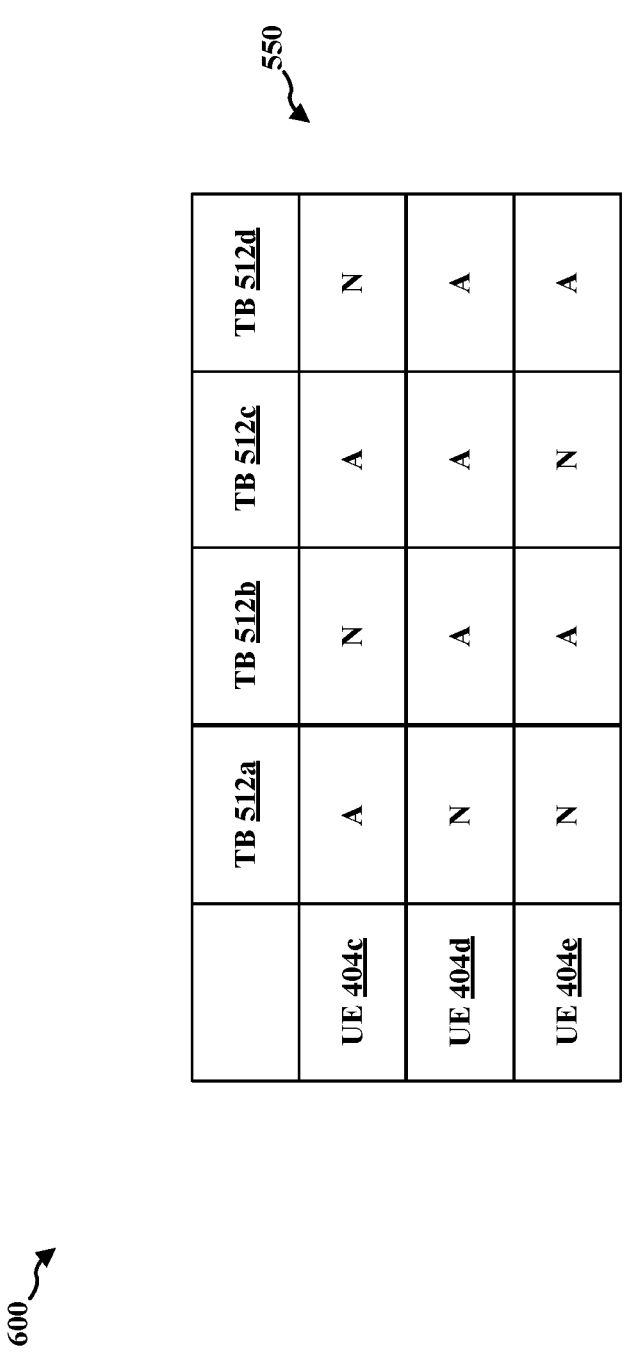
FIG. 6 is a diagram illustrating example ACK/NACK status information for a plurality of transport blocks (TBs) and a plurality of UEs.

FIG. 6 is a diagram 600 of an example of ACK/NACK status 550 for a plurality of TBs 512 (e.g., TBs 512a, 512b, 512c, 512d) and a plurality of UEs 404. The plurality of UEs 404 may be a group of intended receiving devices. The plurality of UEs 404 for each transport block 512 may be determined based on a location of the transmitting device, a range of the transmitting device, and a unicast or groupcast destination ID and source ID. The ACK/NACK status 550 for each TB 512 and UE 404 may be one of ACK, NACK, or unknown depending on the ACK condition. For example, according to the first or second example ACK conditions, the ACK status 550 may be initialized to unknown or NACK upon receipt of the NC request 514. For the third example ACK condition, the ACK status 550 may be initialized to ACK upon receipt of the NC request 514.

The ACK receiver component 124 may update the ACK status 550 for each UE 404 and each transport block 512 based on received transmission ACK/NACKs 522 and NC ACK/NACKs 540. The transmission ACK/NACK 522 from a UE (e.g., UE 404c) may indicate ACK or NACK for a single transport block, and the ACK receiver component 124 may update the ACK status 550 for the UE 404 based on the ACK or NACK. For example, if the transmission ACK/NACK 522 from UE 404d indicates ACK for the TB 512a, the ACK receiver component 124 may change the NACK to an ACK. In implementations where the NC ACK/NACKs 540 indicate the status of each TB 512, the ACK receiver component 124 may similarly update the ACK/NACK status 550 of the UE for each TB 512 included in the NC transmission 530. In implementations where the NC ACK/NACKs 540 indicate only ACK/NACK for the NC transmission 530, the ACK receiver component 124 may not update the ACK/NACK status in response to a NACK because the status of TBs 512 does not change if the NC transmission 530 is not received correctly. When the NC ACK/NACK 540 indicates only ACK, for the NC transmission 530, the ACK receiver component 124 may determine whether the NC transmission 530 would have updated the ACK/NACK status for each TB 512 encoded in the NC transmission 530 based on the current ACK/NACK status 550 for the UE 404. For example, if the UE 404d ACKs a NC transmission 530 encoding the TB 512a and TB 512c, the ACK receiver component 124 may change the NACK for TB 512a to ACK. In contrast, if the UE 404e ACKs the same NC transmission 530 encoding the TB 512a and TB 512c, the ACK receiver component 124 may not change the status 550 of either TB 512a or 512c because the NC transmission 530 alone may be insufficient to decode two TBs. The NC encoding device 130 may transmit a NC transmission 530 encoding a different combination of TBs such that the UE 404e is able to decode one of TB 512a or 512c.

Figure 7:
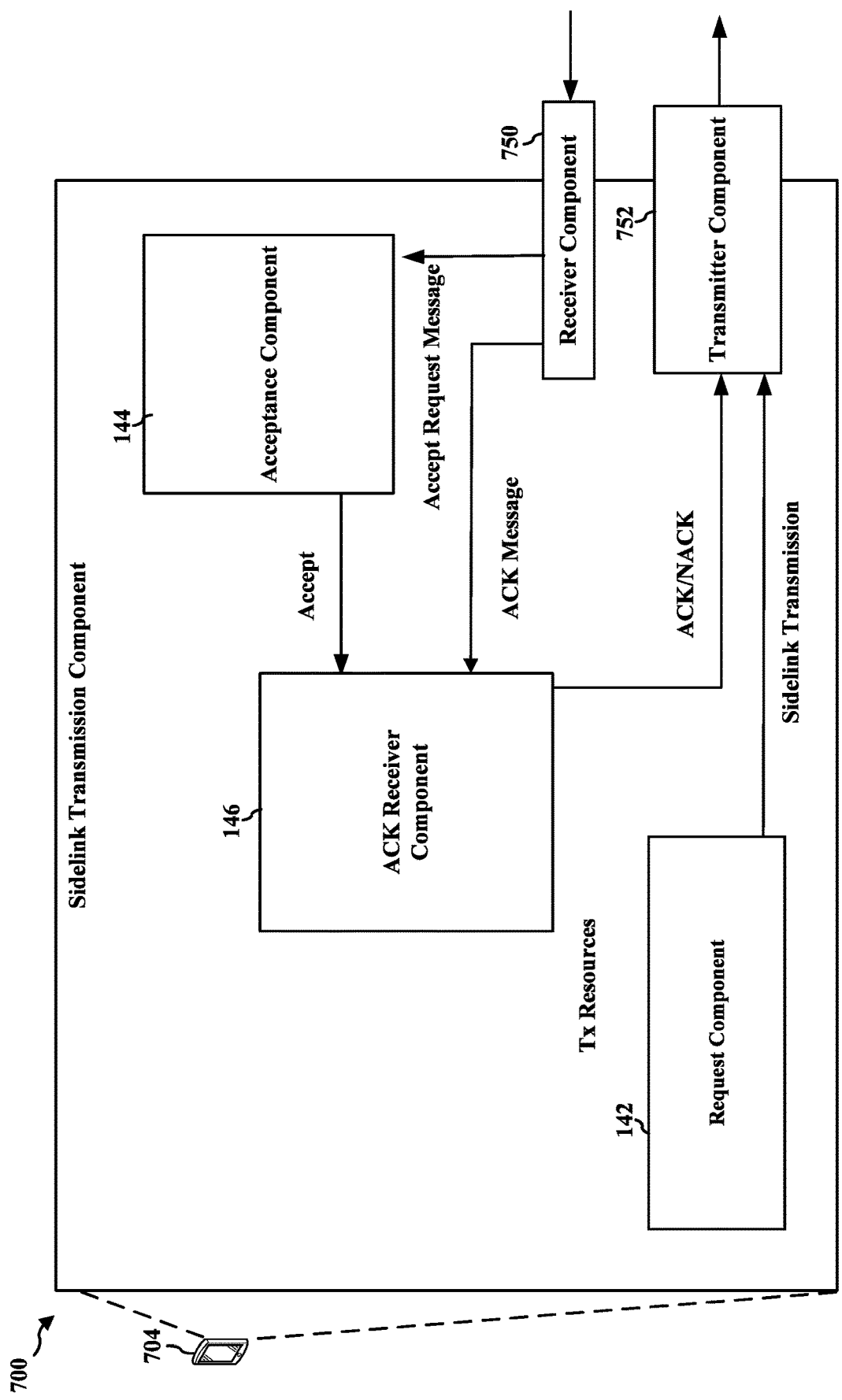
FIG. 7 is a conceptual data flow diagram illustrating the data flow between different means/components in an example UE for sidelink transmissions.

FIG. 7 is a conceptual data flow diagram 700 illustrating the data flow between different means/components in an example UE 704, which may be an example of a UE 104 including the sidelink transmission component 140.

The UE 704 may include a receiver component 750, which may include, for example, a radio frequency (RF) receiver for receiving the signals described herein. The UE 704 may include a transmitter component 752, which may include, for example, an RF transmitter for transmitting the signals described herein. In an aspect, the receiver component 750 and the transmitter component 752 may be co-located in a transceiver such as illustrated by the TX/RX 318 in FIG. 3.

As discussed with respect to FIG. 1, the sidelink transmission component 140 may include the request component 142, the acceptance component 144, and the ACK receiver component 146.

The receiver component 750 may receive sidelink signals such as a sidelink transmission 510, the accept request message 520, or an ACK message 560. The receiver component 750 may pass the accept request message 520 to the ACK receiver component 124. The receiver component 750 may pass the ACK message 560 to the ACK receiver component 124.

The request component 142 may be configured to transmit a transport block 512 and a NC request 514 to a NC encoding device 130 to retransmit the transport block to a plurality of UEs 404. For example, the request component 142 may transmit the sidelink transmission 510 including the transport block 512a and the NC request 514 on a PDSCH. The transport block 512 may be generated based on data from higher layers. In some implementations, the request component 142 may also generate and transmit an SCI 516 to schedule the sidelink transmission 510. The NC request 514 may indicate an ACK condition for the transport block 512. In some implementations, the NC request 514 may indicate whether the NC encoding device 130 is to transmit an ACK message 560. In some implementations, the NC request 514 may indicate whether to transmit the ACK message 560 as a physical layer signal or a dedicated feedback packet. In some implementations, the NC request 514 may be included in the SCI 516. In some implementations, the NC request 514 may be included in a MAC header of the transport block 512. The request component 142 may provide the sidelink transmission 510 to the transmitter component 752 for transmission to the NC encoding device 130 and the plurality of UEs 404.

The acceptance component 144 may be configured to receive, from the NC encoding device 130 via the receiver component 750, an acceptance of the request (e.g., accept request message 520). In some implementations, the acceptance component 144 may enable an NC ACK procedure in response to the accept request message 520. For example, the acceptance component 144 may configure the ACK receiver component 146 and/or the receiver component 750 to receive the ACK message 560. In some implementations, the acceptance component 144 may disable a standard sidelink ACK procedure in response to the accept request message 520. For example, the acceptance component 144 may configure the ACK receiver component 146 and/or the receiver component 750 not to monitor for ACKs from the UEs 104.

The ACK receiver component 146 may be configured to receive, from the NC encoding device 130 via the receiver component 750, an ACK message 560 for the transport block 512. The ACK message 560 may indicate ACK if the transport block 512 has satisfied the ACK condition or a NACK if the ACK condition has not been satisfied at an expiration time after the acceptance of the request. In some implementations, the ACK message 560 is a physical layer signal for the transport block. For example, the ACK message 560 may be transmitted on the PSFCH at a set time based on the accept request message 520. In some implementations, the ACK message 560 is a dedicated feedback packet (e.g., a sidelink transmission on the PSSCH). The dedicated feedback packet may include one or more of: each of a plurality of ACKs or NACKs from the plurality of UEs for the transport block; an ACK for each transport block that has satisfied the ACK condition and has not been acknowledged by a corresponding transmitting device; a NACK for each transport block that has not received at least one ACK prior to the expiration time; a NACK for each transport block that has not received an ACK from each of the plurality of UEs; an indication of acceptance of a request to retransmit the transport block; or an indication of whether to acknowledge the dedicated feedback packet. In some implementations, the dedicated feedback packet is a groupcast message to a plurality of transmitting devices including the UE 704. In some implementations, the dedicated feedback packet is a unicast message to the transmitting device corresponding to the transport block. Depending on the ACK condition, the ACK receiver component 146 may determine whether the transport block 512 was received by one or more of the plurality of UEs 404. Where the ACK message 560 requests acknowledgment, the ACK receiver component 146 may transmit an ACK/NACK via the transmitter component 752.

Figure 8:
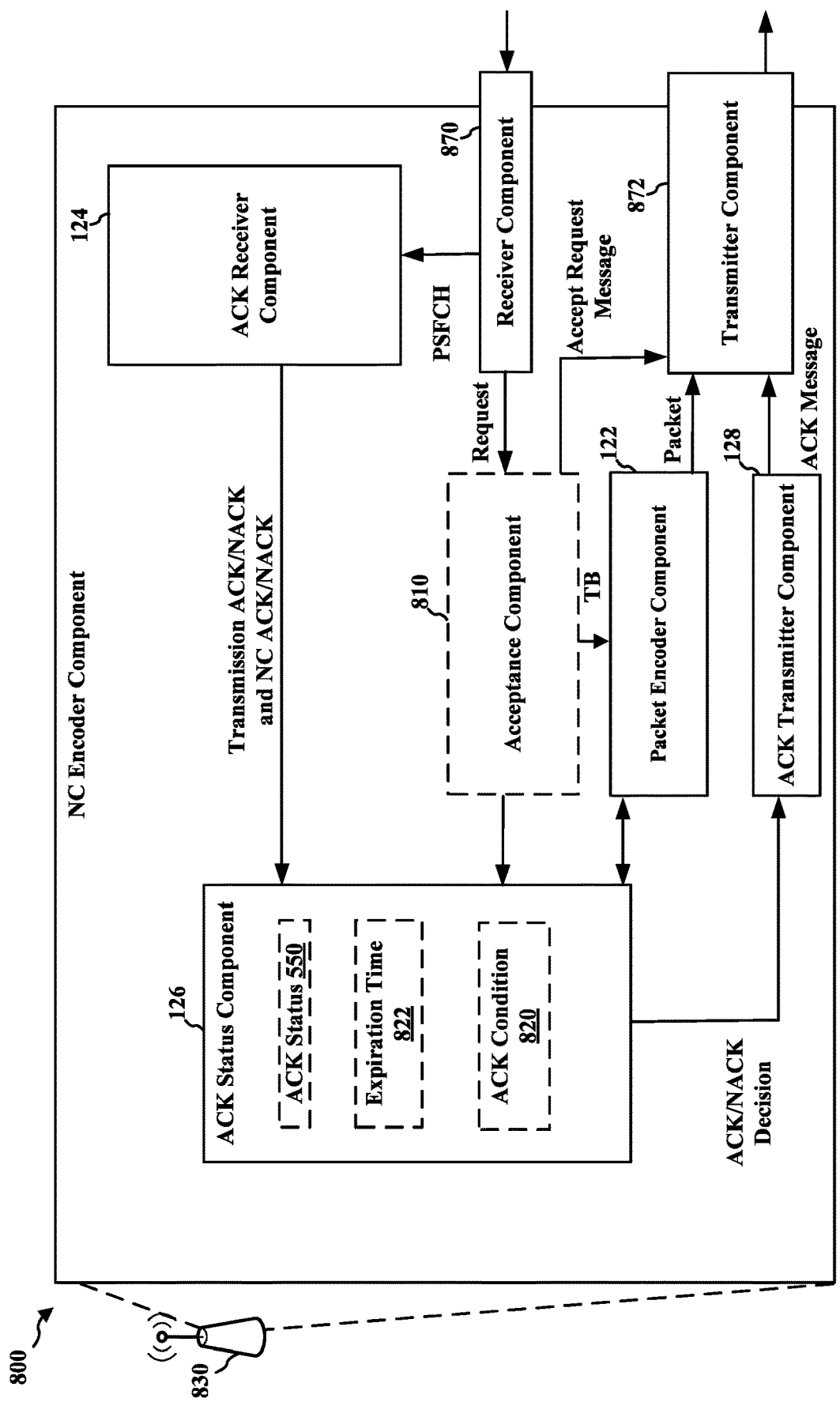
FIG. 8 is a conceptual data flow diagram illustrating the data flow between different means/components in a NC encoding device for sidelink retransmissions.

FIG. 8 is a conceptual data flow diagram 800 illustrating the data flow between different means/components in an example NC encoding device 830, which may be an example of the NC encoding device 130 the NC encoder component 120.

The NC encoding device 130 may include a receiver component 870, which may include, for example, a RF receiver for receiving the signals described herein. The NC encoding device 130 may include a transmitter component 872, which may include, for example, an RF transmitter for transmitting the signals described herein. In an aspect, the receiver component 870 and the transmitter component 872 may co-located in a transceiver such as the TX/RX 352 in FIG. 3.

As discussed with respect to FIG. 1, the NC encoder component 120 may include the packet encoder component 122, the ACK receiver component 124, the ACK status component 126, and the ACK transmitter component 128. The NC encoder component 120 may optionally include an acceptance component 810.

The receiver component 870 may receive sidelink signals such as the sidelink transmission 510, the transmission ACK/NACKs 522, and the NC ACK/NACKs 540. The receiver component 870 may pass the sidelink transmission 510 to the acceptance component 810 and/or the packet encoder component 122. The receiver component may pass the transmission ACK/NACKs 522 and the NC ACK/NACKs 540 to the ACK receiver component 124.

The acceptance component 810 may be configured to receive a request to retransmit a transport block. For example, the acceptance component 810 may receive the NC request 514 via the receiver component 870. The acceptance component 810 may determine whether to transmit an ACK or NACK for the transmission block, the ACK condition for the transmission block, and/or how to transmit an acknowledgment message based on the NC request 514. The acceptance component 810 may provide the ACK condition to the ACK status component 126. The acceptance component 810 may provide the transport block to the packet encoder component 122. The acceptance component 810 may be configured to transmit, to one of the transmitting devices via the transmitter component 872, an acceptance (e.g., accept request message 520) of the NC request 514 to retransmit the respective transport block.

The packet encoder component 122 may be configured to transmit a packet 532 encoding a plurality of transport blocks 512 previously transmitted by one or more transmitting devices (e.g., UEs 404). For example, the packet encoder component 122 may select the transport blocks 512 to transmit based on an ACK status 550 of the transport blocks for a plurality of UEs 404. For instance, the plurality of UEs may be a group of intended receiving devices determined based on a transmission location plus a communication range, a unicast destination/source ID, and/or groupcast source ID. In some implementations, the packet encoder component 122, may select a combination of transport blocks that would result in a largest number of changes of NACK to ACK for the plurality of UEs 404 if the packet is correctly received by the plurality of UEs 404. The packet encoder component 122 may encode the packets using network coding (e.g., an erasure code or Reed-Solomon code). The packet encoder component 122 may transmit the packet via the transmitter component 872.

The ACK receiver component 124 may be configured to receive a plurality of ACKs or NACKs for the plurality of transport blocks 512 from a plurality of UEs 404. The plurality of ACKs or NACKs may include transmission ACK/NACKs 522 and/or NC ACK/NACKs 540. The ACK receiver component 124 may pass the ACK/NACKs to the ACK status component 126.

The ACK status component 126 may be configured to determine, for a respective transport block 512 of the plurality of transport blocks encoded in the packet, whether the respective transport block has satisfied an ACK condition based on the plurality of ACKs or NACKs from the plurality of UEs. For example, the ACK status component 126 may maintain the ACK status 550 for each UE 404 for the TB 512. The ACK status component 126 may evaluate an ACK condition 820 for the TB 512 in response to an update of the ACK status 550. The ACK status component 126 may also evaluate the ACK condition 820 at the expiration time 822 (e.g., measured from the accept request message 520). The ACK status component 126 may provide an ACK/NACK decision to the ACK transmitter component 128. The ACK status component 126 may also provide the ACK status 550 to the packet encoder component 122 for selecting which TBs 512 to include in the packet 532.

The ACK transmitter component 128 may be configured to transmit an acknowledgment message 560 to the one or more transmitting devices for at least the respective transport block 512. The acknowledgment message 560 may indicate an ACK if the respective transport block has satisfied the ACK condition or a NACK if the ACK condition has not been satisfied at the expiration time 822 after transmitting the packet. In some implementations, the ACK transmitter component 128 may transmit the acknowledgment message 560 as a physical layer signal for the respective transport block 512. For example, the ACK transmitter component 128 may transmit the ACK message 560 on the PSFCH. In some implementations, the ACK transmitter component 128 may transmit the acknowledgment message 560 as a dedicated feedback packet. For example, the ACK transmitter component 128 may transmit the ACK message 560 on the PSSCH. The dedicated feedback packet may allow more detailed information about the ACK/NACK status. For example, the dedicated feedback packet may include one or more of: each of the plurality of ACKs or NACKs from the plurality of UEs for the respective transport block; an ACK for each of the plurality of transport blocks that have satisfied the ACK condition and have not been acknowledged by the at least one transmitting device; a NACK for each transport block that has not received at least one ACK prior to the expiration time; a NACK for each transport block that has not received an ACK from each of the plurality of UEs; an indication of acceptance of a request to retransmit another transport block; or an indication of whether to acknowledge the dedicated feedback packet. The dedicated feedback packet may be a groupcast message or a unicast message. The ACK transmitter component 128 may provide the acknowledgment message to the transmitter component 872 for transmission.

Figure 9:
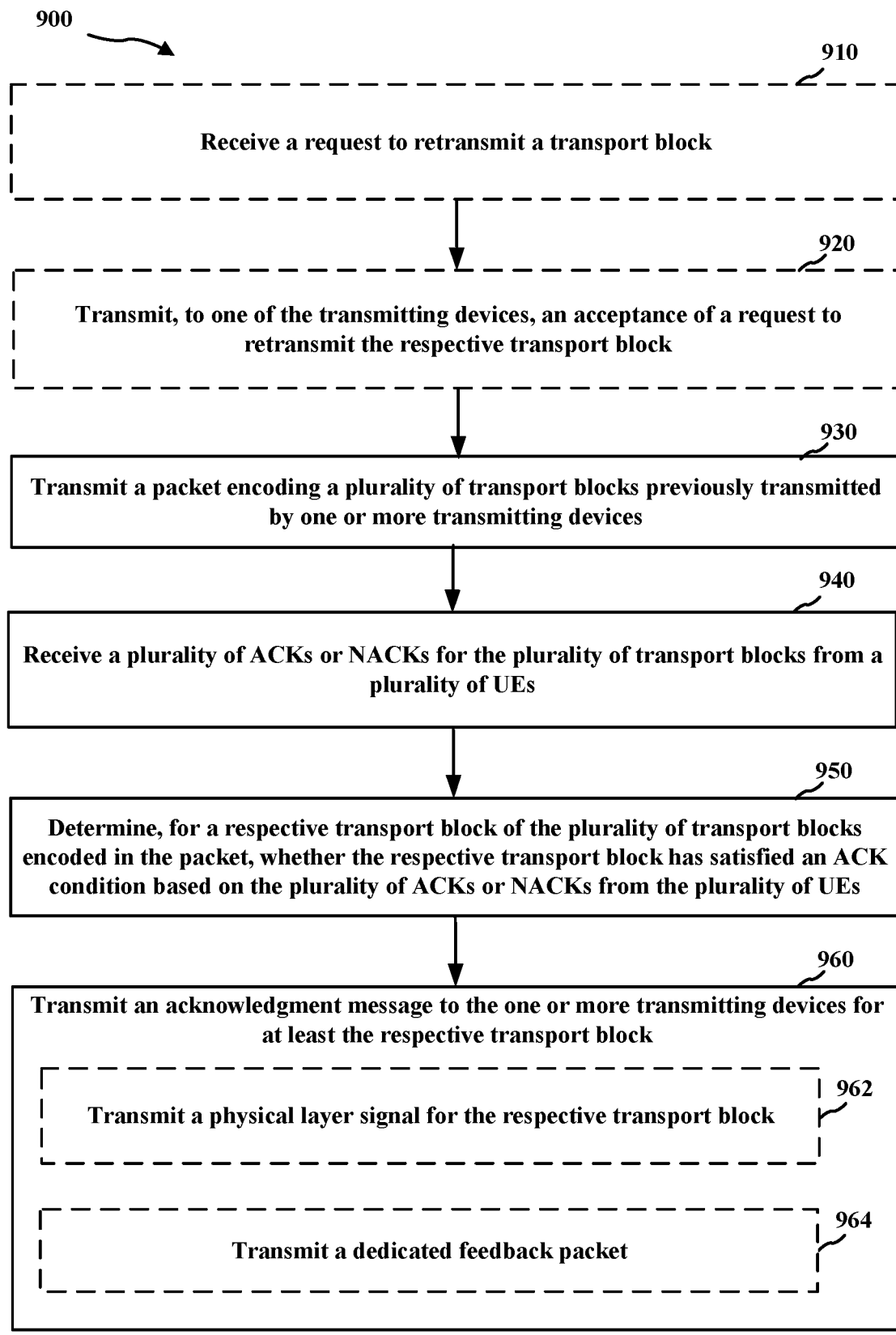
FIG. 9 is a flowchart of an example of a method of sidelink retransmission using network coding.

FIG. 9 is a flowchart of an example method 900 for operating a NC encoding device 130 for retransmission of previously transmitted TBs. The method 900 may be performed by a NC encoding device 130 (which may correspond to NC encoding device 130, NC encoding device 830, transmitting device 310, a RSU, or a UE 104) which may include the memory 376 and which may be the entire NC encoding device 130 or a component of the NC encoding device 130 such as the NC encoder component 120, TX processor 316, the RX processor 370, or the controller/processor 375. The method 900 may be performed by the NC encoder component 120 in communication with the sidelink transmission component 140 of the transmitting UE 104.

At block 910, the method 900 may optionally include receiving a request to retransmit a transport block. In an aspect, for example, the NC encoding device 130, the RX processor 370 and/or the controller/processor 375 may execute the NC encoder component 120 and/or the acceptance component 810 to receive the NC request 514 to retransmit a transport block 512. In some implementations, the NC request 514 indicates whether to transmit an ACK or NACK for the transmission block and the ACK condition 820 for the transmission block. In some implementations, the NC request 514 indicates whether to transmit the acknowledgment message as a physical layer signal or a dedicated feedback packet. In some implementations, the NC request 514 is included in a field of a SCI 516 scheduling the respective transport block or a MAC header of the respective transport block. Accordingly, the UE 104, the RX processor 370, and/or the controller/processor 375 executing the NC encoder component 120 and/or the acceptance component 810 may provide means for receiving a request to retransmit a transport block.

At block 920, the method 900 may optionally include transmitting, to one of the transmitting devices, an acceptance of a request to retransmit the respective transport block. In an aspect, for example, the NC encoding device 130, the TX processor 316 and/or the controller/processor 375 may execute the NC encoder component 120 and/or the acceptance component 810 to transmit, to one of the transmitting devices (e.g., UE 404a), an acceptance (e.g., accept request message 520) of the NC request 514 to retransmit the transport block 512. In some implementations, an expiration time 822 after transmitting the packet (e.g., when a NACK is transmitted) is measured from the acceptance. Accordingly, the UE 104, the TX processor 316, and/or the controller/processor 375 executing the NC encoder component 120 and/or the acceptance component 810 may provide means for transmitting, to one of the transmitting devices, an acceptance of a request to retransmit the respective transport block.

At block 930, the method 900 includes transmitting a packet encoding a plurality of transport blocks previously transmitted by one or more transmitting devices. In an aspect, for example, the NC encoding device 130, the TX processor 316 and/or the controller/processor 375 may execute the NC encoder component 120 and/or the packet encoder component 122 to transmit the packet 532 encoding a plurality of transport blocks 512 previously transmitted by one or more transmitting devices (e.g., UE 404a). Accordingly, the UE 104, the TX processor 316, and/or the controller/processor 375 executing the NC encoder component 120 and/or the packet encoder component 122 may provide means for transmitting a packet encoding a plurality of transport blocks previously transmitted by one or more transmitting devices.

At block 940, the method 900 includes receiving a plurality of ACKs or NACKs for the plurality of transport blocks from a plurality of UEs. In an aspect, for example, the NC encoding device 130, the RX processor 370 and/or the controller/processor 375 may execute the NC encoder component 120 and/or the ACK receiver component 124 to receive a plurality of ACKs or NACKs for the plurality of transport blocks from a plurality of UEs. Accordingly, the UE 104, the RX processor 370, and/or the controller/processor 375 executing the NC encoder component 120 and/or the ACK receiver component 124 may provide means for receiving a plurality of ACKs or NACKs for the plurality of transport blocks from a plurality of UEs.

At block 950, the method 900 includes determining, for a respective transport block of the plurality of transport blocks encoded in the packet, whether the respective transport block has satisfied an ACK condition based on the plurality of ACKs or NACKs from the plurality of UEs. In an aspect, for example, the NC encoding device 130, the RX processor 370 and/or the controller/processor 375 may execute the NC encoder component 120 and/or the ACK status component 126 to determine, for a respective transport block (e.g., 512a) of the plurality of transport blocks 512 encoded in the packet 532, whether the respective transport block 512a has satisfied an ACK condition 820 based on the plurality of ACKs or NACKs (522, 540) from the plurality of UEs 404. In some implementations, the ACK condition is that the NC encoder has received an ACK for the respective transport block from at least one UE of the plurality of UEs. In some implementations, the ACK condition is that the NC encoder has received an ACK for the respective transport block from each UE of the plurality of UEs. In some implementations, the ACK condition is that the NC encoder has not received a NACK for the respective transport block from any of the plurality of UEs. Accordingly, the UE 104, the RX processor 370, and/or the controller/processor 375 executing the NC encoder component 120 and/or the ACK status component 126 may provide means for determining, for a respective transport block of the plurality of transport blocks encoded in the packet, whether the respective transport block has satisfied an ACK condition based on the plurality of ACKs or NACKs from the plurality of UEs.

At block 960, the method 900 includes transmitting an acknowledgment message to the one or more transmitting devices for at least the respective transport block. In an aspect, for example, the NC encoding device 130, the TX processor 316 and/or the controller/processor 375 may execute the NC encoder component 120 and/or the ACK transmitter component 128 to transmit an acknowledgment message to the one or more transmitting devices for at least the respective transport block. For example, at sub-block 962, the block 960 may optionally include transmitting a physical layer signal for the respective transport block. As another example, at sub-block 964, the block 960 may optionally include transmitting a dedicated feedback packet. The dedicated feedback packet may include one or more of: the dedicated feedback packet includes one or more of: each of the plurality of ACKs or NACKs from the plurality of UEs for the respective transport block; an ACK for each of the plurality of transport blocks that have satisfied the ACK condition and have not been acknowledged by the at least one transmitting device; a NACK for each transport block that has not received at least one ACK prior to the expiration time; a NACK for each transport block that has not received an ACK from each of the plurality of UEs; an indication of acceptance of a request to retransmit a transport block; or an indication of whether to acknowledge the dedicated feedback packet. In some implementations, the dedicated packet is a groupcast message to the one or more transmitting devices. In some implementations, the dedicated packet is a unicast message to the transmitting device corresponding to the respective transport block. Accordingly, the UE 104, the TX processor 316, and/or the controller/processor 375 executing the NC encoder component 120 and/or the ACK transmitter component 128 may provide means for Transmit an acknowledgment message to the one or more transmitting devices for at least the respective transport block.

Figure 10:
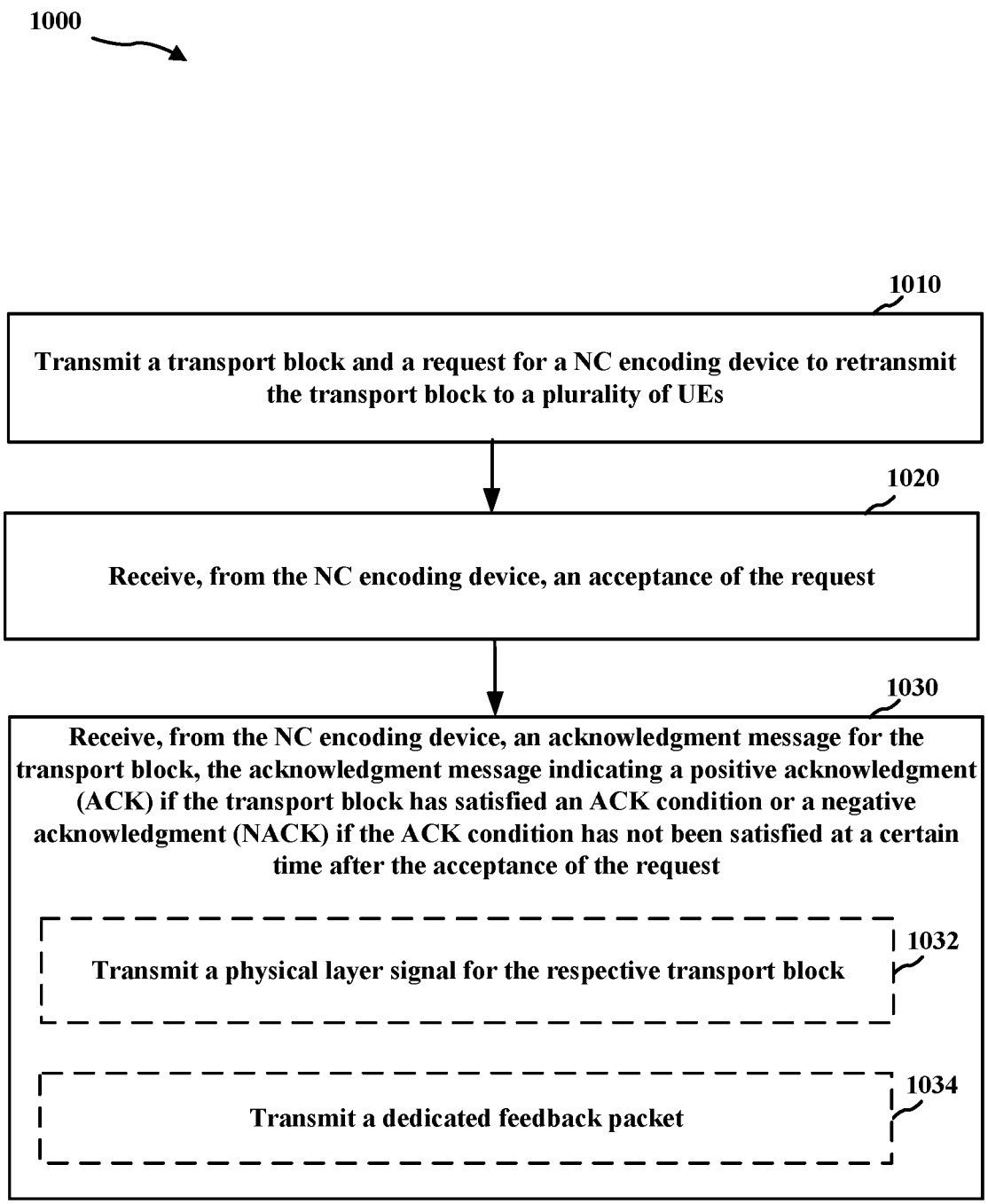
FIG. 10 is a flowchart of an example of a method of transmitting a sidelink communication with network coding for retransmissions.

FIG. 10 is a flowchart of an example method 1000 for operating a transmitting UE (e.g., UE 404*a* for sidelink transmission with retransmission by the NC encoding device 130. The method 1000 may be performed by a UE (such as the UE 104, which may include the memory 360 and which may be the entire UE 104 or a component of the UE 104 such as the sidelink transmission component 140, TX processor 368, the RX processor 356, or the controller/processor 359). The method 1000 may be performed by the sidelink transmission component 140 in communication with the NC encoder component 120 of the NC encoding device 130.

At block 1010, the method 1000 may include transmitting a transport block and a request for a NC encoding device to retransmit the transport block to a plurality of UEs. In an aspect, for example, the UE 104, the TX processor 368 and/or the controller/processor 359 may execute the sidelink transmission component 140 and/or the request component 142 to transmit a transport block 512 and the NC request 514 for the NC encoding device 130 to retransmit the transport block 512 to a plurality of UEs 404. In some implementations, the request indicates whether to transmit an ACK or NACK for the transport block 512 and the ACK condition 820 for the transport block. In some implementations, the ACK condition 820 is that the NC encoding device 130 has received an ACK for the transport block from at least one UE of the plurality of UEs. 16. In some implementations, the ACK condition 820 is that the NC encoding device 130 has received an ACK for the transport block from each UE of the plurality of UEs. In some implementations, the ACK condition 820 is that the NC encoding device 130 has not received a NACK for the transport block from any of the plurality of UEs. In some implementations, the request indicates whether to transmit a physical layer signal or a dedicated feedback packet. In some implementations, the NC request 514 is included in a field of the SCI 516 that schedules the transport block 512 or a MAC header of the transport block. Accordingly, the UE 104, the TX processor 368, and/or the controller/processor 359 executing the sidelink transmission component 140 and/or the request component 142 may provide means for transmitting a transport block and a request for a NC encoding device to retransmit the transport block to a plurality of UEs.

At block 1020, the method 1000 may include receiving, from the NC encoding device, an acceptance of the request. In an aspect, for example, the UE 104, the RX processor 356 and/or the controller/processor 359 may execute the sidelink transmission component 140 and/or the acceptance component 144 to receive, from the NC encoding device, an acceptance of the request. Accordingly, the UE 104, the RX processor 356, and/or the controller/processor 359 executing the sidelink transmission component 140 and/or the acceptance component 144 may provide means for receiving, from the NC encoding device, an acceptance of the request.

At block 1030, the method 1000 may include receiving, from the NC encoding device, an acknowledgment message for the transport block. In an aspect, for example, the UE 104, the RX processor 356 and/or the controller/processor 359 may execute the sidelink transmission component 140 and/or the ACK receiver component 146 to receive, from the NC encoding device, an acknowledgment message 560 for the transport block 512. The acknowledgment message 560 may indicate an ACK if the transport block has satisfied an ACK condition 820 or a NACK if the ACK condition 820 has not been satisfied at an expiration time 822 after the acceptance of the NC request 514. For example, at sub-block 1032, the block 1030 may optionally include receiving a physical layer signal for the transport block. As another example, at sub-block 1034, the block 1030 may optionally include receiving a dedicated feedback packet. The dedicated feedback packet may include one or more of: the dedicated feedback packet includes one or more of: each of the plurality of ACKs or NACKs from the plurality of UEs for the respective transport block; an ACK for each of the plurality of transport blocks that have satisfied the ACK condition and have not been acknowledged by the at least one transmitting device; a NACK for each transport block that has not received at least one ACK prior to the expiration time; a NACK for each transport block that has not received an ACK from each of the plurality of UEs; an indication of acceptance of a request to retransmit a transport block; or an indication of whether to acknowledge the dedicated feedback packet. In some implementations, the dedicated packet is a groupcast message to the one or more transmitting devices. In some implementations, the dedicated feedback packet is a unicast message to the transmitting device corresponding to the transport block. Accordingly, the UE 104, the RX processor 356, and/or the controller/processor 359 executing the sidelink transmission component 140 and/or the ACK receiver component 146 may provide means for receiving, from the NC encoding device, an acknowledgment message for the transport block.

SOME FURTHER EXAMPLE CLAUSES

1. A method of wireless communication at a network coding (NC) encoder, comprising:
    transmitting a packet encoding a plurality of transport blocks previously transmitted by one or more transmitting devices;
    receiving a plurality of acknowledgments (ACK) or negative acknowledgments (NACK) for the plurality of transport blocks from a plurality of user equipment (UEs);
    determining, for a respective transport block of the plurality of transport blocks encoded in the packet, whether the respective transport block has satisfied an ACK condition based on the plurality of ACKs or NACKs from the plurality of UEs; and transmitting an acknowledgment message to the one or more transmitting devices for at least the respective transport block, the acknowledgment message indicating an ACK if the respective transport block has satisfied the ACK condition or a NACK if the ACK condition has not been satisfied at an expiration time after transmitting the packet.
2. The method of clause 1, wherein the ACK condition is that the NC encoder has received an ACK for the respective transport block from at least one UE of the plurality of UEs.

3. The method of clause 1, wherein the ACK condition is that the NC encoder has received an ACK for the respective transport block from each UE of the plurality of UEs.

4. The method of clause 1, wherein the ACK condition is that the NC encoder has not received a NACK for the respective transport block from any of the plurality of UEs.

5. The method of any of clauses 1-4, further comprising transmitting, to one of the transmitting devices, an acceptance of a request to retransmit the respective transport block, wherein the expiration time after transmitting the packet is measured from the acceptance.

6. The method of any of clauses 1-5, wherein transmitting the acknowledgment message comprises transmitting a physical layer signal for the respective transport block.

7. The method of any of clauses 1-5, wherein transmitting the acknowledgment message comprises transmitting a dedicated feedback packet, wherein the dedicated feedback packet includes one or more of:
  each of the plurality of ACKs or NACKs from the plurality of UEs for the respective transport block;
  an ACK for each of the plurality of transport blocks that have satisfied the ACK condition and have not been acknowledged by the one or more transmitting devices;
  a NACK for each transport block that has not received at least one ACK prior to the expiration time;
  a NACK for each transport block that has not received an ACK from each of the plurality of UEs;
  an indication of acceptance of a request to retransmit a transport block; or
  an indication of whether to acknowledge the dedicated feedback packet.

8. The method of clause 7, wherein the dedicated feedback packet is a groupcast message to the one or more transmitting devices.

9. The method of clause 7, wherein the dedicated feedback packet is a unicast message to the transmitting device corresponding to the respective transport block.

10. The method of any of clauses 1-9, further comprising receiving a request to retransmit the respective transport block.

11. The method of clause 10, wherein the request indicates whether to transmit an ACK or NACK for the transport block and the ACK condition for the transport block.

12. The method of clause 10, wherein the request indicates whether to transmit the acknowledgment message as a physical layer signal or a dedicated feedback packet.

13. The method of clause 10, wherein the request is included in a field of sidelink control information (SCI) scheduling the respective transport block or a media access control (MAC) header of the respective transport block.

14. An apparatus for wireless communication at a network coding (NC) encoder, comprising:
  a memory storing computer-executable instructions; and
  at least one processor configured to execute the instructions to perform the method of any of clauses 1-13.

15. An apparatus for wireless communication at a network coding (NC) encoder, comprising means for performing the method of any of clauses 1-13.

16. A non-transitory computer-readable medium storing computer executable code for wireless communication at a network coding (NC) encoder, the code when executed by a processor causes the processor to perform the method of any of clauses 1-13.

17. A method of wireless communication at a transmitting device, comprising:
  transmitting a transport block and a request for a network coding (NC) encoding device to retransmit the transport block to a plurality of user equipment (UEs);
  receiving, from the NC encoding device, an acceptance of the request; and
  receiving, from the NC encoding device, an acknowledgment message for the transport block, the acknowledgment message indicating a positive acknowledgment (ACK) if the transport block has satisfied an ACK condition or a negative acknowledgment (NACK) if the ACK condition has not been satisfied at an expiration time after the acceptance of the request.

18. The method of clause 17, wherein the ACK condition is that the NC encoding device has received an ACK for the transport block from at least one UE of the plurality of UEs.

19. The method of clause 17, wherein the ACK condition is that the NC encoding device has received an ACK for the transport block from each UE of the plurality of UEs.

20. The method of clause 17, wherein the ACK condition is that the NC encoding device has not received a NACK for the transport block from any of the plurality of UEs.

21. The method of any of clauses 17-20, wherein receiving the acknowledgment message comprises receiving a physical layer signal for the transport block.

22. The method of any of clauses 17-20, wherein receiving the acknowledgment message comprises receiving a dedicated feedback packet, wherein the dedicated feedback packet includes one or more of:
  each of a plurality of ACKs or NACKs from the plurality of UEs for the transport block;
  an ACK for each transport block that has satisfied the ACK condition and has not been acknowledged by a corresponding transmitting device;
  a NACK for each transport block that has not received at least one ACK prior to the expiration time;
  a NACK for each transport block that has not received an ACK from each of the plurality of UEs;
  an indication of acceptance of a request to retransmit the transport block; or
  an indication of whether to acknowledge the dedicated feedback packet.

23. The method of clause 22, wherein the dedicated feedback packet is a groupcast message to a plurality of transmitting devices including the transmitting device.

24. The method of clause 22, wherein the dedicated feedback packet is a unicast message to the transmitting device.

25. The method of any of clauses 17-24, wherein the request indicates whether to transmit an ACK or NACK for the transport block and the ACK condition for the transport block.

26. The method of any of clauses 17-24, wherein the request indicates whether to transmit a physical layer signal or a dedicated feedback packet.

27. The method of any of clauses 17-24, wherein the request is included in a field of sidelink control information (SCI) that schedules the transport block or a media access control (MAC) header of the transport block.

28. An apparatus for wireless communication at a transmitting device, comprising:
  a memory storing computer-executable instructions; and
  at least one processor configured to execute the instructions to perform the method of any of clauses 17-27.

29. An apparatus for wireless communication at a network coding (NC) encoder, comprising means for performing the method of any of clauses 17-27.

30. A non-transitory computer-readable medium storing computer executable code for wireless communication at a network coding (NC) encoder, the code when executed by a processor causes the processor to perform the method of any of clauses 17-27.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication at a network coding (NC) encoder, comprising:
transmitting a packet encoding a plurality of transport blocks previously transmitted by one or more transmitting devices;
receiving a plurality of acknowledgments (ACK) or negative acknowledgments (NACK) for the plurality of transport blocks from a plurality of user equipment (UEs);
determining, for a respective transport block of the plurality of transport blocks encoded in the packet, whether the respective transport block has satisfied an ACK condition based on the plurality of ACKs or NACKs from the plurality of UEs; and
transmitting an acknowledgment message to the one or more transmitting devices for at least the respective transport block, the acknowledgment message indicating an ACK if the respective transport block has satisfied the ACK condition or a NACK if the ACK condition has not been satisfied at an expiration time after transmitting the packet.

2. The method of claim 1, wherein the ACK condition is that the NC encoder has received an ACK for the respective transport block from at least one UE of the plurality of UEs.

3. The method of claim 1, wherein the ACK condition is that the NC encoder has received an ACK for the respective transport block from each UE of the plurality of UEs.

4. The method of claim 1, wherein the ACK condition is that the NC encoder has not received a NACK for the respective transport block from any of the plurality of UEs.

5. The method of claim 1, further comprising transmitting, to one of the transmitting devices, an acceptance of a request to retransmit the respective transport block, wherein the expiration time after transmitting the packet is measured from the acceptance.

6. The method of claim 1, wherein transmitting the acknowledgment message comprises transmitting a physical layer signal for the respective transport block.

7. The method of claim 1, wherein transmitting the acknowledgment message comprises transmitting a dedicated feedback packet, wherein the dedicated feedback packet includes one or more of:
each of the plurality of ACKs or NACKs from the plurality of UEs for the respective transport block;
an ACK for each of the plurality of transport blocks that have satisfied the ACK condition and have not been acknowledged by the one or more transmitting devices;
a NACK for each transport block that has not received at least one ACK prior to the expiration time;
a NACK for each transport block that has not received an ACK from each of the plurality of UEs;
an indication of acceptance of a request to retransmit a transport block; or
an indication of whether to acknowledge the dedicated feedback packet.

8. The method of claim 7, wherein the dedicated feedback packet is a groupcast message to the one or more transmitting devices.

9. The method of claim 7, wherein the dedicated feedback packet is a unicast message to the transmitting device corresponding to the respective transport block.

10. The method of claim 1, further comprising receiving a request to retransmit the respective transport block.

11. The method of claim 10, wherein the request indicates whether to transmit an ACK or NACK for the transport block and the ACK condition for the transport block.

12. The method of claim 10, wherein the request indicates whether to transmit the acknowledgment message as a physical layer signal or a dedicated feedback packet.

13. The method of claim 10, wherein the request is included in a field of sidelink control information (SCI) scheduling the respective transport block or a media access control (MAC) header of the respective transport block.

14. A method of wireless communication at a transmitting device, comprising:
transmitting a transport block and a request for a network coding (NC) encoding device to retransmit the transport block to a plurality of user equipment (UEs);
receiving, from the NC encoding device, an acceptance of the request; and
receiving, from the NC encoding device, an acknowledgment message for the transport block, the acknowledgment message indicating a positive acknowledgment (ACK) if the transport block has satisfied an ACK condition or a negative acknowledgment (NACK) if the ACK condition has not been satisfied at an expiration time after the acceptance of the request.

15. The method of claim 14, wherein the ACK condition is that the NC encoding device has received an ACK for the transport block from at least one UE of the plurality of UEs.

16. The method of claim 14, wherein the ACK condition is that the NC encoding device has received an ACK for the transport block from each UE of the plurality of UEs.

17. The method of claim 14, wherein the ACK condition is that the NC encoding device has not received a NACK for the transport block from any of the plurality of UEs.

18. The method of claim 14, wherein receiving the acknowledgment message comprises receiving a physical layer signal for the transport block.

19. The method of claim 14, wherein receiving the acknowledgment message comprises receiving a dedicated feedback packet, wherein the dedicated feedback packet includes one or more of:
 each of a plurality of ACKs or NACKs from the plurality of UEs for the transport block;
 an ACK for each transport block that has satisfied the ACK condition and has not been acknowledged by a corresponding transmitting device;
 a NACK for each transport block that has not received at least one ACK prior to the expiration time;
 a NACK for each transport block that has not received an ACK from each of the plurality of UEs;
 an indication of acceptance of a request to retransmit the transport block; or
 an indication of whether to acknowledge the dedicated feedback packet.

20. The method of claim 19, wherein the dedicated feedback packet is a groupcast message to a plurality of transmitting devices including the transmitting device.

21. The method of claim 19, wherein the dedicated feedback packet is a unicast message to the transmitting device.

22. The method of claim 14, wherein the request indicates whether to transmit an ACK or NACK for the transport block and the ACK condition for the transport block.

23. The method of claim 14, wherein the request indicates whether to transmit a physical layer signal or a dedicated feedback packet.

24. The method of claim 14, wherein the request is included in a field of sidelink control information (SCI) that schedules the transport block or a media access control (MAC) header of the transport block.

25. An apparatus for wireless communication at a network coding (NC) encoder, comprising:
 a memory storing computer-executable instructions; and
 at least one processor configured to execute the instructions to:
  transmit a packet encoding a plurality of transport blocks previously transmitted by one or more transmitting devices;
  receive a plurality of acknowledgments (ACK) or negative acknowledgments (NACK) for the plurality of transport blocks from a plurality of user equipment (UEs);
  determine, for a respective transport block of the plurality of transport blocks encoded in the packet, whether the respective transport block has satisfied an ACK condition based on the plurality of ACKs or NACKs from the plurality of UEs; and
  transmit an acknowledgment message to the one or more transmitting devices for at least the respective transport block, the acknowledgment message indicating an ACK if the respective transport block has satisfied the ACK condition or a NACK if the ACK condition has not been satisfied at an expiration time after transmitting the packet.

26. The apparatus of claim 25, wherein the ACK condition is one of: a condition that the NC encoder has received an ACK for the respective transport block from at least one UE of the plurality of UEs, a condition that the NC encoder has received an ACK for the respective transport block from each UE of the plurality of UEs, or a condition that the NC encoder has not received a NACK for the respective transport block from any of the plurality of UEs.

27. The apparatus of claim 25, wherein the at least one processor is configured to:
 receive a request to retransmit the respective transport block; and
 transmit, to one of the transmitting devices, an acceptance of a request to retransmit the respective transport block, wherein the expiration time after transmitting the packet is measured from the acceptance.

28. An apparatus for wireless communication at a transmitting device, comprising:
 a memory storing computer-executable instructions; and
 at least one processor configured to execute the instructions to:
  transmit a transport block and a request for a network coding (NC) encoding device to retransmit the transport block to a plurality of user equipment (UEs);
  receive, from the NC encoding device, an acceptance of the request; and
  receive, from the NC encoding device, an acknowledgment message for the transport block, the acknowledgment message indicating a positive acknowledgment (ACK) if the transport block has satisfied an ACK condition or a negative acknowledgment (NACK) if the ACK condition has not been satisfied at an expiration time after the acceptance of the request.

29. The apparatus of claim 28, wherein the request indicates to transmit an ACK or NACK for the transport block, the ACK condition for the transport block, and whether to transmit a physical layer signal or a dedicated feedback packet.

30. The apparatus of claim 28, wherein the request is included in a field of sidelink control information (SCI) that schedules the transport block or a media access control (MAC) header of the transport block.

* * * * *